United States Patent Office 2,749,945
Patented June 12, 1956

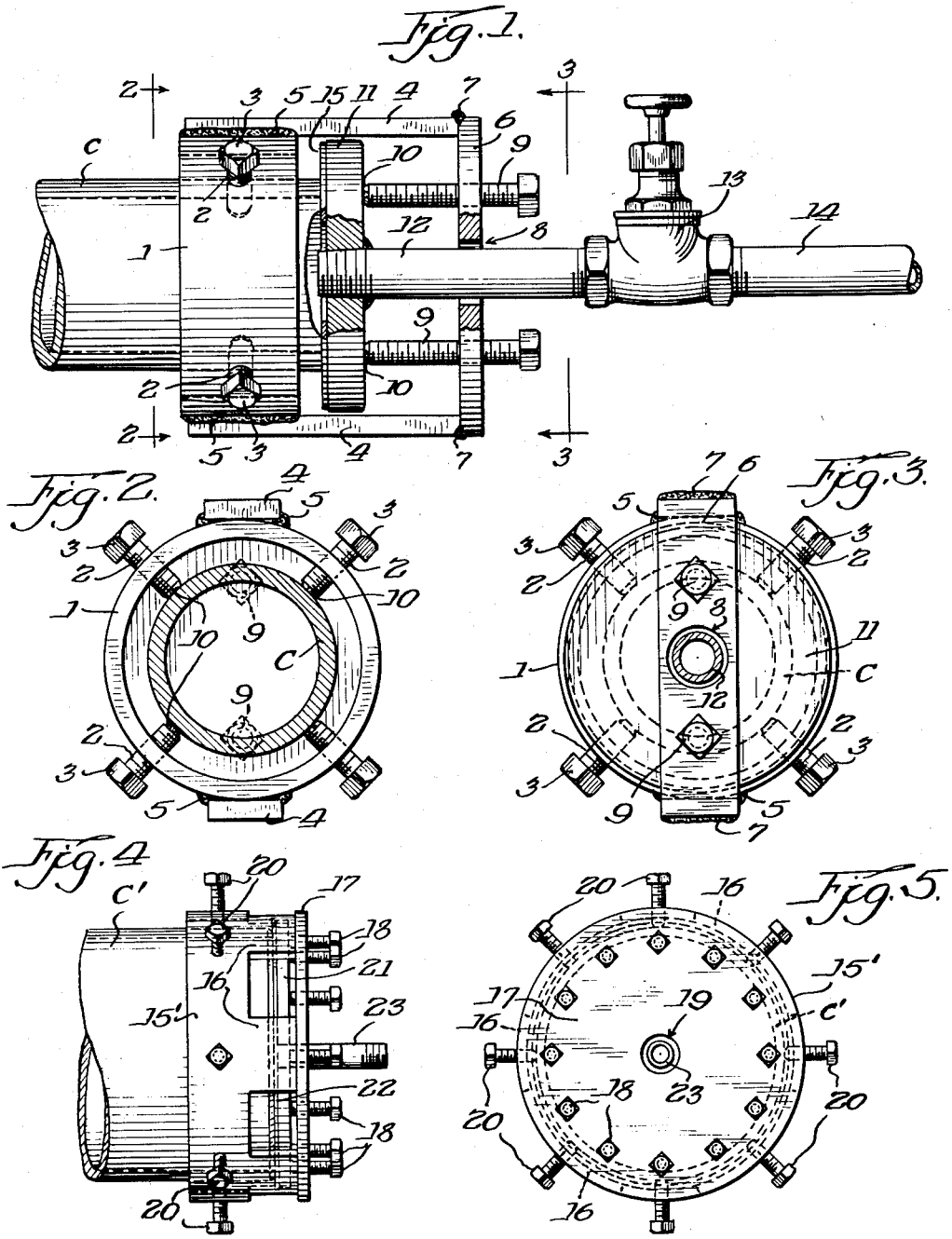

2,749,945

CAPPING DEVICE FOR USE IN TESTING CONDUIT LINES

Edward W. Kaiser, Glenview, Ill.

Application May 28, 1954, Serial No. 433,233

3 Claims. (Cl. 138—90)

This invention pertains to conduit systems, more particularly to a capping device advantageous for use in the temporary yet positive closing of the open end or ends of an installed conduit system whereby the conduits of the system may be tested throughout their lengths for fluid tightness of both conduits and joints interconnecting the same.

It is an object of the invention to provide a capping device wherein the closure cap thereof is of simple, durable and self-seating construction so that when engaged over a conduit open end, it will ensure effectual closure thereof even though said end is irregularly cut, corroded, pitted or malformed.

It is also an object of the invention to provide a capping device adaptable to and over the open ends of conduits which is of extremely simple and durable construction capable of successfully withstanding that rugged use to which field employed devices are frequently subjected, and remaining operative and dependable over a long period of time.

The foregoing, as well as other objects, advantages and meritorious teachings of my invention, will be in part obvious and in part pointed out in the following detailed disclosures thereof, when taken in conjunction with the accompanying drawings, it being understood that the forms of the invention presented herein are a precise and what are now considered to be the better modes of embodying its principles, but that other modifications and changes may be made in specific embodiment without departing from its essential features.

In the drawings:

Figure 1 is a side elevation of my improved capping device with parts thereof broken away and shown in section, showing it operatively engaged over the open end of a conduit.

Figure 2 is a transverse section taken on the line 2—2 of Figure 1 looking in the direction in which the arrows point.

Figure 3 is a transverse section taken on the line 3—3 of Figure 1 looking in the direction in which the arrows point.

Figure 4 is a side elevation of a modified form of the improved capping device operatively engaged over the open end of a conduit, and Figure 5 is an outer side elevation of the capping device.

Referring in detail to the drawings, particularly, to the form of my invention shown in Figures 1, 2 and 3, the same comprises a circular sleeve or collar 1 open at either end, having a plurality of relatively spaced clamping or set screws 2 radially and threadedly engaged with and through the same. The outer ends of the screws are headed as at 3 to facilitate turning thereof, though they may be kerfed, if so desired.

Relatively diametrically opposed and substantially flat complemental rigid bars 4 are transversely arranged on and adjacent the outer peripheral sides of the collar in the manner shown in Figure 1 and are welded or otherwise connected thereto, as at 5. It will be here noted that the outer end portions of said bars extend from and beyond the outer open end of the sleeve and are aligned.

A cross-head 6 of length permitting the seating of its opposite end portions on the squared outer ends of the extended outer portions of the bars 4 is provided. It is fixedly joined thereto, as by welding at 7, or by other suitable means. A way 8 is formed in and through the medial portion of the head, while screw threaded openings are also formed therein on the opposite sides of said way in equi-spaced relation thereto.

Complemental elongated clamping or set screws 9 are threadedly engaged in and through the screw threaded openings in the crosshead and have their respective heads disposed outwardly of or beyond the same as is also shown in Figure 1.

The inner ends of the screws 2 and 9 are preferably reduced and cupped, as generally indicated by the numeral 10 whereby to ensure positive or "biting" engagement, at times, the purpose of which will be presently apparent.

The diameter or size of the sleeve 1 is such that it can be freely slipped over and onto one end portion of a conduit C and be positioned in proximity to its open end (see Figure 1). It may, of course, be of different sizes so as to be adaptable to conduits or pipes of different diameters.

A non-flexible cover plate 11, usually of circular shape, is provided to the capping device. It is positioned between the bars 4 and inwardly of the reduced ends of the screws 9. Said cover plate is of a size or diameter greater than the open near end of the conduit C; hence when moved onto said end, it will positively close the same. A substantially medially located screw threaded opening is formed in and through the cover plate and has the threaded inner end of a nipple-like length of pipe 12 turned thereinto. Said pipe is loosely received through the way 8 in the cross-head 6 and extends beyond the same, where it is fitted with a suitable cut-off valve generally identified by the numeral 13, whose opposite port has the adjacent end of a supply pipe 14 engaged therein. The supply pipe, it will be understood, communicates with a reservoir containing a suitable testing fluid (not shown).

A gasket 15 may be and preferably is arranged on the normally inner side of the cover plate for an obvious purpose.

In usage of the capping device, the collar or sleeve 1 is slid over the open end portion of a conduit C which, as will be understood, forms a part of a conduit system line whose fluid tightness is to be tested. When positioned in the manner shown in Figure 1, the clamping screws 2 are turned inwardly thereby positively and fixedly engaging their reduced ends 10 with adjacent portions of the conduit C. Thereupon the gasket equipped cover plate 11 is manually moved toward, onto and over the open end of the conduit. Following this, the clamping screws 9 are turned inwardly through the cross-head 6. By so doing, the cover plate will be firmly seated over the conduit open end, fully closing the same. The gasket 15 on the cover plate ensures a positive closure. At this time, the valve 13 positioned between the nipple-like pipe 12 and the supply pipe 14 is opened, permitting a regulated flow of testing fluid to enter the conduit C and fill the conduit line sufficiently to effectually test its fluid tightness and hence, its operative efficiency.

When sufficient test has been made, the flow of testing fluid is reversed and the conduit line emptied. Of course, it will be understood that the cut-off valve may be provided with a by-pass discharge in which event and following a conduit line testing, the by-pass may be opened and the testing fluid (air, gas or liquid) discharged from said line.

Because of the loose engagement of the nipple-like pipe 12 through the over-sized way 8 in the cross-head 6, it will be seen and understood that self-adjusting movement of the cover plate 11 with relation to the aforesaid open end of the conduit C will be permitted, as and when it is first manually moved thereover and then clampingly seated on and over said open end under urge of the inwardly turned clamping screws 9. Consequently, a positive closing of the conduit end and the conduit system in which it is included, will be assured, whether said open end of the conduit C is corroded, irregularly cut or formed, pitted, etc. This feature is of considerable and vital importance to the successful usage or operation of my improved capping device.

In Figures 4 and 5 of the drawings, I have shown a modified form of my improved capping device. Herein, the usage of the bars 4 and the cross-head 6 of the form of invention shown in Figures 1, 2 and 3, is eliminated. It comprises a circular collar or sleeve 15 having complemental and relatively equi-spaced finger-like longitudinal extensions 16 integral with its open outer end.

A circular head plate 17 of shape and size substantially corresponding to that of the sleeve 15', is seated on and over the squared outer ends of the finger extensions 16 and permanently joined thereto by welding or other suitable means. Circularly disposed and relatively spaced clamping screws generally designated by the numeral 18 are threadedly engaged with and through the head plate, preferably in proximity to its periphery. Also the plate has a medially located way 19 formed therein, the purpose of which will be presently apparent.

Other and relatively equi-spaced radially disposed clamping screws 20 are threadedly engaged through the sleeve 15' and have their heads beyond its outer sides to facilitate turning engagement.

A circular cover plate 21 of non-flexible or rigid material is slidably or movably received within the sleeve 15' in proximity to the head plate 17 and the reduced inner ends of the clamping screws 18. The size of this plate is such that it will have overlapping and seating engagement on the adjacent or near open end of the conduit C'. Also its inner side is preferably provided with a suitable form of gasket 22.

At this point, it will be noted, that because of the dispositioning and form of the finger extensions 16, the cover plate 21 will be visible from without the capping sleeve 15'. A medially screw headed opening is formed in and through the cover plate 21 and has one end of a nipple-like pipe 23 turned into engagement therewith. The outer portion of this pipe is loosely received through the way 19 formed in the medial portion of the head plate 17. Its outer end may be screw threaded or otherwise prepared to facilitate the connection of a suitable type of cut-off valve thereon such as the form of valve shown in the preceding embodiment of my invention indicated by the numeral 13. Furthermore, it will be understood, that a supply pipe extended from a suitable reservoir of testing fluid similar to the supply pipe 14 will be connected to this cut-off valve.

The usage of my modified form of the capping device corresponds to that of the first described embodiment of my invention.

In mounting the sleeve 15' on the conduit C', it is so located that the finger extensions 16 are disposed or extended outwardly from and beyond the open end of said conduit C'. Thereby, it is manifest that a cage-like compartment is provided for the cover plate 22. Thus, said cover plate will be at all times retained in a position aligning or substantially aligning with the open near end of the conduit C. Consequently, as and when said cover plate is moved inwardly, its gasket faced inner side will engage over and close this open end. Furthermore, as and when the clamping screws 18 engaging through the head plate 17 are turned inwardly, they will bear upon and thrust the cover plate firmly onto and over the open end of the conduit C' ensuring its fluid tight closure.

It is to be also understood that because of the loose reception of the nipple-like pipe 23 through the way 19 in the capping device head plate 17, self-seating adjustment of the cover plate 21 with relation to said open end of the conduit C' will be ensured, notwithstanding the fact that said open end of the conduit may be corroded, irregularly cut or formed, pitted, etc.

It will of course be understood that following the usage of my improved capping device in a conduit line testing operation, said device may be quickly and conveniently removed for future or additional usage.

Whereas, I have hereinbefore described the invention as being particularly adaptable and advantageous for usage in the capping of conduit lines to facilitate testing operations, it will be understood that said invention may be as equally advantageously employed as a cap for sealing off the open ends of oil well casings, etc., during or subsequently to drilling operations.

I claim:

1. A conduit capping device, comprising an open ended conduit engaging sleeve, one end of said sleeve having a plurality of longitudinally disposed relatively spaced finger-like extensions integral therewith extended beyond the adjacent open end of a conduit, a head plate permanently on and over the outer ends of said extensions closing the outer end of said sleeve, a cover plate movably received within the sleeve between the adjacent open end of the conduit and said head plate, said cover plate being of a size greater than that of the adjacent open end of the conduit, means on said head plate operable to impart inward movement to said cover plate whereby to move the same onto and to retain the same over the adjacent open end of the conduit, and a nipple-like pipe engaged through an opening formed in a medial portion of said cover plate, the outer portion of said nipple-like pipe being loosely received through an opening formed in an adjacent portion of said head plate.

2. A pressure testing device for conduits, comprising a sleeve of cross-sectional shape substantially corresponding to that of an end portion of a conduit and of size permitting its engagement over and about said end portion with its walls in substantially parallel relation to the outer sides thereof and its outer end portion extended outwardly from and beyond the conduit open end, means for connecting the sleeve to the conduit, the extended outer end portion of the sleeve having spaced openings therein, a cover plate of size greater than the conduit open end slidably received within the extended outer end portion of the sleeve with its inner face substantially parallel to the conduit open end and its edges exposed through the spaced openings in the sleeve, a head plate permanently on the extended outer end of said sleeve and confining the cover plate within the sleeve, an outwardly extended nipple engaged with and through the cover plate and slidably engaged through and extended outwardly beyond said head plate, and means on the head plate operable to impart inward sliding movement to the cover plate whereby to seat and retain the same over the conduit open end.

3. A pressure testing device for conduits, comprising a sleeve of cross-sectional shape substantially corresponding to that of an end portion of a conduit and of size permitting its engagement over and about said end portion with its walls in substantially parallel relation to the outer sides thereof and its outer end portion extended outwardly from and beyond the conduit open end, means for connecting the sleeve to the conduit, the extended outer end portion of the sleeve having spaced openings therein, a cover plate of size greater than the conduit open end slidably received within the extended outer end portion of the sleeve with its inner face substantially parallel to the conduit open end and its edges exposed through the spaced openings in the sleeve, a head plate permanently on the extended outer end of said sleeve and confining the cover plate within the sleeve, an outwardly extended nipple engaged with and through the cover plate and slidably engaged through and extended outwardly beyond said head plate, and means engaged with and through the head plate having their inner ends in bearing engagement with the adjacent face of said cover plate operable to impart inward sliding movement to the cover plate whereby to seat and retain the same over the conduit open end.

References Cited in the file of this patent

UNITED STATES PATENTS

| | | |
|---|---|---|
| 165,562 | Gravelius | July 13, 1875 |
| 531,253 | Biart | Dec. 18, 1894 |
| 667,333 | Pflugh | Feb. 5, 1901 |
| 1,928,821 | Santiago | Oct. 3, 1933 |
| 2,512,041 | Steele | June 20, 1950 |
| 2,526,238 | Kendall | Oct. 17, 1950 |
| 2,662,663 | Schmidt et al. | Dec. 15, 1953 |
| 2,663,326 | Curtis | Dec. 22, 1953 |

FOREIGN PATENTS

| | | |
|---|---|---|
| 571,261 | Great Britain | Aug. 28, 1944 |